(12) United States Patent  (10) Patent No.: US 11,480,044 B2
Menard et al.  (45) Date of Patent: Oct. 25, 2022

(54) PORTABLE LOCAL POSITIONING SYSTEM (71) Applicant: Frank's International, LLC, Houston, TX (US)

(72) Inventors: Seth Menard, Carencro, LA (US); Marcus Savini, Church Point, LA (US); Jeremy R. Angelle, Youngsville, LA (US); Logan Smith, Lafayette, LA (US); Robert L. Thibodeaux, Lafayette, LA (US); Brennan Domec, Sunset, LA (US)

(73) Assignee: FRANK'S INTERNATIONAL, LLC, Houston, TX (US)

( * ) Notice: Subject to any disclaimer, the term of this patent is extended or adjusted under 35 U.S.C. 154(b) by 864 days.

(21) Appl. No.: 16/274,072

(22) Filed: Feb. 12, 2019

(65) Prior Publication Data

US 2019/0249538 A1  Aug. 15, 2019

Related U.S. Application Data (60) Provisional application No. 62/631,035, filed on Feb. 15, 2018.

(51) Int. Cl.
*E21B 44/00* (2006.01)
*G01S 5/14* (2006.01)
(Continued)

(52) U.S. Cl.
CPC .......... *E21B 44/00* (2013.01); *E21B 41/0021* (2013.01); *F16P 3/147* (2013.01); *G01S 5/14* (2013.01); *G08B 21/02* (2013.01)

(58) Field of Classification Search
None
See application file for complete search history.

(56) References Cited

U.S. PATENT DOCUMENTS 5,345,471 A  9/1994 McEwan
6,054,950 A  4/2000 Fontana
(Continued)

FOREIGN PATENT DOCUMENTS

EP  2643802 A1  10/2013

OTHER PUBLICATIONS

Corrales et al., "Cooperative Tasks Between Humans and Robots in Industrial Environments", International Journal of Advanced Robotic Systems, 2012, vol. 9, 94:2012, pp. 1-10.
(Continued)

*Primary Examiner* — Thomas S McCormack
(74) *Attorney, Agent, or Firm* — MH2 Technology Law Group LLP (57) ABSTRACT Systems, methods, and computer-readable media for mitigating collision occurrences on a drilling rig, of which an example of the method includes associating ultra wide band (UWB) tags with pieces of rig equipment and rig personnel. The tags are configured to communicate with one or more anchors. The method also includes determining interlock rules associated with each of the pieces of rig equipment, monitoring positions of the pieces of rig equipment and the rig personnel using the tags, in real-time, determining that one or more of the interlock rules are violated by a position of one or more of the pieces of rig equipment, rig personnel, or both, and, in response to determining that the one or more of the interlock rules are violated, at least partially disabling operation of one or more of the pieces of rig equipment.

24 Claims, 6 Drawing Sheets

(51) Int. Cl.
*E21B 41/00* (2006.01)
*F16P 3/14* (2006.01)
*G08B 21/02* (2006.01)

(56) References Cited

U.S. PATENT DOCUMENTS

| | | | |
|---|---|---|---|
| 6,208,248 | B1 | 3/2001 | Ross |
| 6,512,455 | B2 | 1/2003 | Finn et al. |
| 6,917,284 | B2 | 7/2005 | Grisham et al. |
| 6,989,751 | B2 | 1/2006 | Richards |
| 7,403,783 | B2 | 7/2008 | Cheok et al. |
| 7,605,696 | B2 | 10/2009 | Quatro |
| 7,750,808 | B2 | 7/2010 | Masino et al. |
| 7,868,760 | B2 | 1/2011 | Smith et al. |
| 8,116,350 | B1 | 2/2012 | Arndt et al. |
| 9,124,006 | B2 | 9/2015 | Ding |
| 9,360,583 | B2 | 6/2016 | Donderici et al. |
| 2007/0017682 | A1 | 1/2007 | Abrahamsen et al. |
| 2010/0289662 | A1* | 11/2010 | Dasilva .......... F16P 3/147 340/686.6 |
| 2011/0309931 | A1* | 12/2011 | Rose .......... G06Q 10/08 340/539.13 |
| 2015/0158428 | A1 | 6/2015 | Beggs et al. |
| 2016/0292513 | A1 | 10/2016 | Kozicz et al. |
| 2017/0314369 | A1 | 11/2017 | Rosano et al. |

OTHER PUBLICATIONS

Giretti et al., "Ultra Wide Band Positioning Systems for Advanced Constructions Site Management", INTECH open science | open minds, 2012, http://dx.doi.org/10.5772/48260, accessed Feb. 28, 2019, pp. 1-24.

Metrom Rail, Aura™ Roadway Worker Protection System, https://metrom-rail.com/AURA-RWPS, accessed Feb. 28, 2019, pp. 1-4.

Metrom Rail, Aura™ Collision Avoidance System, https://metrom-rail.com/filebin/images/products/pdf/AURA_ProdSht_0124a.pdf, accessed Feb. 28, 2019, pp. 1-4.

Dardari et al., "High-Accuracy Tracking Using Ultrawideband Signals for Enhanced Safety of Cyclists", Hindawi, Mobile Information Systems, vol. 2017, Article ID 8149348, pp. 1-13.

POSCO, POSCO Adopts IBM Workplace Safety Technology at FINEX Steel Plat, https://www-03.ibm.com/press/us/en/pressrelease/28485.wss, accessed Feb. 28, 2019, pp. 1-2.

Godil et al., "3D Ground-Truth Systems for Object/Human Recognition and Tracking", National Institute of Standards and Technology, Gaithersburg, MD, USA, Mar. 2013, pp. 4321-4328.

Jiang et al., "Ultra Wide Band Technology Applications in Construction: A Review", Organization, Technology and Management in Construction, An International Journal, 2(2)2010, pp. 207-213.

Johnson Space Center, NASA, Real-time Locating System Uses Ultra-Wideband Radio Frequency Signals for fracking, https://www.nasa.gov/centers/johnson/techtransfer/technology/MSC-24184-1-uwb-aoa-tracking.html, accessed Feb. 28, 2019, pp. 1-2.

Mobilvox, Inc, Ultra Wideband Technology Overview, White Paper, Prepared by MobilVox, Inc, Oct. 2004, pp. 1-33.

Aramco, Aramco Tracks Personnel on Jack-Up Barge with Real-Time Tracking System, https://www.chron.com/jobs/article/Silver-Sponsor-Aramco-tracks-personnel-on-7383576.php, accessed Feb. 28, 2019, pp. 1-2.

Identec Solutions, Visibility of Onshore and Offshore Operations Delivers Safety and Productivity, https://www.identecsolutions.com/oil-gas-industry-solutions/, accessed Feb. 28, 2019, pp. 1-3.

Savazzi et al., "Ultra-Wide Band Sensor Networks in Oil and Gas Explorations", IEEE Communications Magazine, Apr. 2013, pp. 150-160.

Norsk Olje&Gass, Deployment of Radio Frequency Identification (RFID) in the Oil and Gas Ndustry, Norwegian Oil and Gas Association Guideline No. 112, Part 5 Personnel HSE, Jan. 7, 2010, pp. 1-29.

Whyte, "Adding the Human Factor to Rig Anti-Collision Systems: A New Technology Explored", Society of Petroleum Engineers, SPE Annual Technical Conference and Exhibition, 2003, https://www.onepetro.org/conference-paper/SPE-84352-MS, accessed Feb. 14, 2018, pp. 1-2.

Whyte, "Adding Human Factor to Rig Anti-Collision Systems", Drilling Contractor, Sep./Oct. 2003, pp. 10-13.

Extended European Search Report dated Jul. 2, 2019, EP Application No. 19157295, pp. 1-13.

\* cited by examiner

FIG. 6

PORTABLE LOCAL POSITIONING SYSTEM

CROSS-REFERENCE TO RELATED APPLICATIONS

This application claims priority to U.S. Provisional Patent Application Ser. No. 62/631,035, which was filed on Feb. 15, 2018 and is incorporated herein by reference in its entirety.

BACKGROUND

There have been many instances in the oil and gas industry where a person was struck by or caught between moving equipment, resulting in serious bodily injury and sometimes death. These types of incidents have shaped the processes and procedures implemented by oilfield employees to help ensure the safety of everyone working on the rig floor. Often, the cause of these incidents is human error, either on the part of the tool operator, and/or the person who finds themselves in an unsafe position.

Anti-collision systems have been developed to increase safety by monitoring the position of equipment and personnel and automatically preventing collisions between drilling equipment and with human users. One such system that has been employed on oil and gas drilling rigs uses cameras to determine a three-axis position location of the drilling equipment and personnel on the rig. However, this means that if one camera's view becomes obstructed, an accurate determination of the position of the different equipment and personnel may not be detectable for a period of time. Furthermore, extreme weather conditions can complicate such detection, e.g., by masking heat signatures in the case of infrared camera devices. In addition, such camera-based systems are often configured for use with permanently installed rig equipment, and adding or removing temporary rig equipment can be burdensome in such systems.

Some other systems have been based on global-positioning systems (GPS), which suffer from low resolution and/or reliability issues (lost signals). Other systems employ radiofrequency identification (RFID) tags, but RFID tags generally only indicate that an RFID has passed through or is in proximity to a "gate" rather than an actual, three-dimensional position, and thus, like GPS systems, systems employing RFID generally suffer from low resolution, e.g., on the order of tens of meters when centimeters may be critical.

SUMMARY

A method for mitigating collision occurrences on a drilling rig is disclosed. The method includes associating ultra wide band (UWB) tags with pieces of rig equipment and rig personnel. The tags are configured to communicate with one or more anchors. The method also includes determining interlock rules associated with each of the pieces of rig equipment, monitoring positions of the pieces of rig equipment and the rig personnel using the tags, in real-time, determining that one or more of the interlock rules are violated by a position of one or more of the pieces of rig equipment, rig personnel, or both, and, in response to determining that the one or more of the interlock rules are violated, at least partially disabling operation of one or more of the pieces of rig equipment.

A system for mitigating collision on a drilling rig is disclosed. The system includes a plurality of ultrawide band (UWB) tags associated with a plurality of pieces of rig equipment, rig personnel, or both, at least one anchor device in communication with the tags and configured to determine a position of the tags by communication therewith, and at least one control device in communication with the at least one anchor device, the at least one control device being configured to perform operations. The operations include associating the UWB tags with the pieces of rig equipment, rig personnel, or both to which the plurality of UWB tags are attached, determining interlock rules associated with each of the pieces of rig equipment, monitoring positions of the pieces of rig equipment and the rig personnel using the tags, in real-time, determining that one or more of the interlock rules are violated by a position of one or more of the pieces of rig equipment, rig personnel, or both, and in response to determining that the one or more of the interlock rules are violated, notifying an operator or at least partially disabling operation of one or more of the pieces of rig equipment.

A non-transitory, computer-readable medium storing instructions that, when executed, cause a computing system to perform operations is disclosed. The operations include associating ultra wide band (UWB) tags with pieces of rig equipment and rig personnel. The tags are configured to communicate with one or more anchors. The operations also include determining interlock rules associated with each of the pieces of rig equipment, monitoring positions of the pieces of rig equipment and the rig personnel using the tags, in real-time, determining that one or more of the interlock rules are violated by a position of one or more of the pieces of rig equipment, rig personnel, or both, and, in response to determining that the one or more of the interlock rules are violated, notifying an operator or at least partially disabling operation of one or more of the pieces of rig equipment.

BRIEF DESCRIPTION OF THE DRAWINGS

The accompanying drawing, which is incorporated in and constitutes a part of this specification, illustrates an embodiment of the present teachings and together with the description, serves to explain the principles of the present teachings. In the figures.

It should be noted that some details of the figure have been simplified and are drawn to facilitate understanding of the embodiments rather than to maintain strict structural accuracy, detail, and scale.

DETAILED DESCRIPTION

The following disclosure describes several embodiments for implementing different features, structures, or functions of the invention. Embodiments of components, arrangements, and configurations are described below to simplify the present disclosure; however, these embodiments are provided merely as examples and are not intended to limit the scope of the invention. Additionally, the present disclosure may repeat reference characters (e.g., numerals) and/or letters in the various embodiments and across the Figures provided herein. This repetition is for the purpose of simplicity and clarity and does not in itself dictate a relationship between the various embodiments and/or configurations discussed in the Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the embodiments presented below may be combined in any combination of ways, e.g., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. In addition, unless otherwise provided herein, "or" statements are intended to be non-exclusive; for example, the statement "A or B" should be considered to mean "A, B, or both A and B."

Embodiments of the disclosure provide a portable local positioning system (PLPS), which employs an Ultra-Wide Band (UWB) radio frequency Real Time Location System (RTLS) on a rig floor to track the real-time location of personnel and equipment, and automatically control/interlock tools to prevent or halt movement of equipment thereby preventing them from colliding into other equipment or endangering personnel. The UWB devices are employed to track position to an accuracy up to 10 cm, in some embodiments, in an indoor (or outdoor) environment. This capability provides enough accuracy to be able to identify the 3D coordinates of equipment or one or more people in a space, so as to maintain safety, as will be described below.

Figure 1:
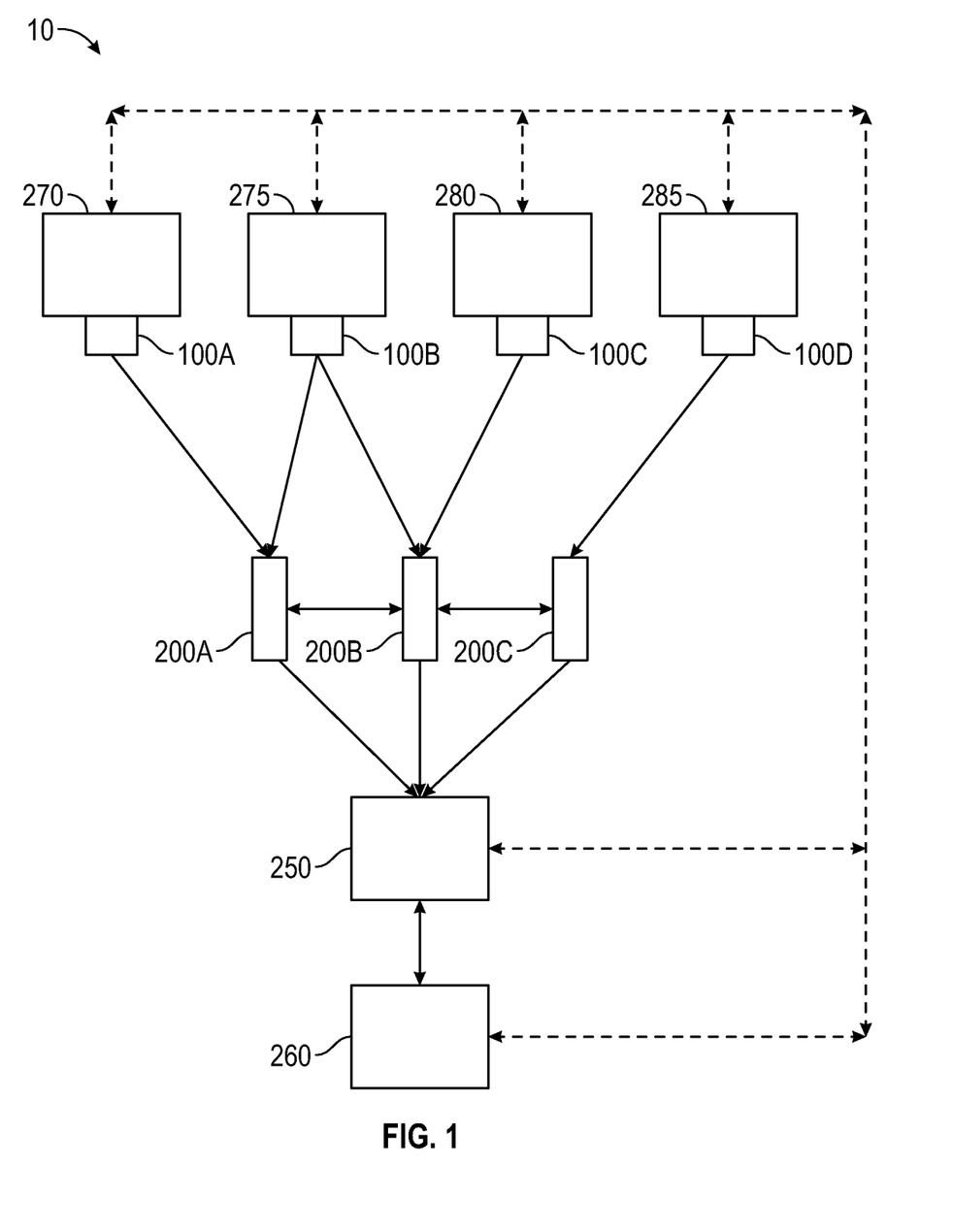
FIG. 1 illustrates a schematic view of a portable local positioning system integrated into a drilling rig, according to an embodiment.
Figure 2A:
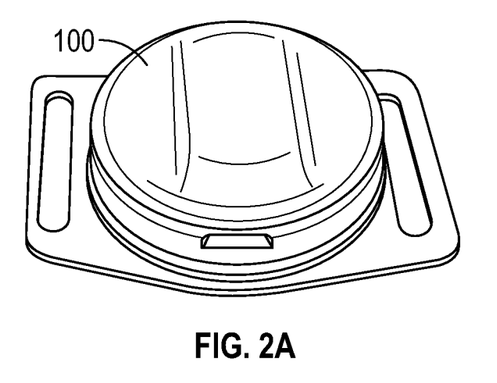
FIG. 2A illustrates an Ultra-Wide Band (UWB) tag, according to an embodiment.

Turning now to a specific example embodiment, FIG. 1 illustrates a schematic view of a PLPS 10 (hereinafter, "system 10") integrated into a rig, according to an embodiment. As shown, the system 10 may include one or more tags (four shown: 100A, 100B, 100C, 100D). FIG. 2A illustrates an example of such a tag 100, implemented as a battery-powered UWB tag. The tag 100 may be mounted or otherwise attached to the equipment and/or personnel to be tracked. The tag 100 may be relatively small, e.g., roughly the size of a US quarter, about 2-4 cm in diameter. It will be appreciated, however, that in other embodiments, the tag 100 may be larger or smaller.

Figure 2B:
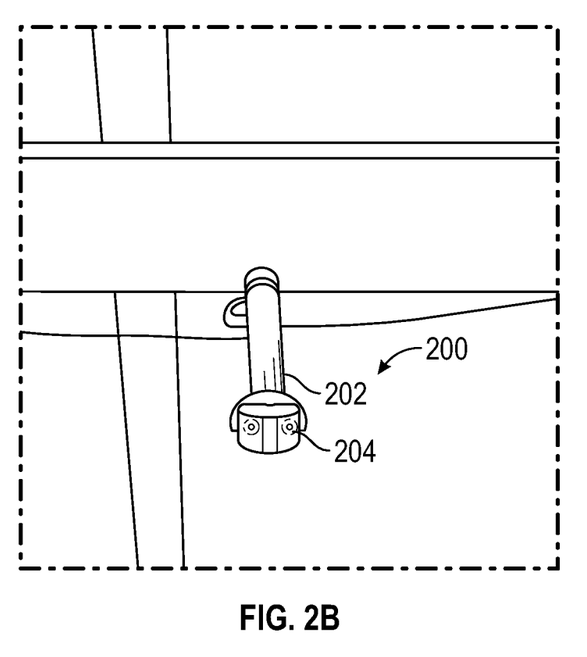
FIG. 2B illustrates an anchor configured to communicate with the tag and determine a relative position thereof, according to an embodiment.

Referring again to FIG. 1, the system 10 also includes one or more anchors (three shown: 200A, 200B, 200C). FIG. 2B illustrates an example of such an anchor 200. As shown, the anchor 200 may be mounted to a structure of the rig, e.g., joists, supports, poles, masts, etc. For example, the anchor 200 may include a base 202 connected to and extending from the rig structure, and a transceiver 204 attached to the base 202. The transceiver 204 may be configured for continuous communication with the UWB tags 100 that are in range.

Again referring to FIG. 1, the anchors 200A-C may be mounted in a known or "reference" position, such that a controller may be able to determine a three-axis position of one of the tags 100, and thus the rig equipment and personnel to which the tag is attached, based on the distance and direction of the tag 100A-D from one or more of the anchors 200A-D. The tags 100A-D may continually communicate with one or more of the anchors 200A-C. The anchors 200A-C, by continually communicating with one or more of the tags 100A-D, can enable a determination of the position of the tags and communicate that information with a computer controller in "real-time". As the term is used herein, "real-time" means at approximately the same time. Thus, for example, a display of objects moving in real-time means that the objects on the display move (possibly with some time lag) at about the same time and at about the same speed (e.g., scaled for view in a visualization) as the objects move in the physical reality.

The system 10 may include any number of anchors 200A-C and any number of tags 100A-D. Moreover, communication between the tags 100A-D and the anchors 200A-C may not be 1:1, that is, a single anchor 200A-C may communicate with zero, one, two, or more tags 100A-D, while any one of the tags 100A-D may communicate with any or all of the anchors 200A-C. Anchor count and location thereof may be customizable, and may be determined during rig surveys to enhance line-of-sight with expected tag 100A-D locations and variability of placement on the X, Y, and Z axes. Further, the anchors 200 may communicate with each other to synchronize the clocks/timing thereof. Such synchronizing permits the system 10 to make an accurate determination in real time of each tag location. The communication between the anchors 200 may be via a wired connections (e.g., fiber, such as Ethernet cables or Power Over Ethernet (POE)), wireless communication, or in any other way. POE, for example, passes electric power along with data on twisted pair Ethernet cabling. Such POE connectivity allows a single cable to provide both a data connection and electric power to devices.

In addition, a PLPS master hub 250 may be connected to a computer 260 for configuration and monitoring of the equipment/personnel activity. The computer 260 may be located in proximity to the hub 250, e.g., at the drilling rig or nearby. Alternatively, the computer 260 may be located remotely from the drilling rig, and in communication with the hub 250 and/or other components of the system 10 via the internet or another communication network. The hub 250 may act as a central network hub for the tags 100A-D on the rig floor.

The system 10 may further include rig control systems (two shown: 270, 275) attached to the rig equipment and configured to control at least a portion of the operation thereof, as will be described in greater detail below. Further, the rig control systems 270, 275 may be able to communicate with the computer 260 and/or the master hub 250, such that the rig equipment associated with the rig control systems 270, 275 may be responsive to messages received from the computer 260 and/or the master hub 250. Similarly, notification devices (two shown: 280, 285) may be provided as part of the system 10 and may be held or attached to rig personnel in some embodiments, and in others, may be attached to stationary rig structures (e.g., such as alarm bells or speakers attached to a wall or joist).

The tags 100A, 100B may be coupled to the rig equipment associated with the control systems 270, 275. In a specific embodiment, the equipment may have designated areas for the tags 100A, 100B to be mounted. In other embodiments, the equipment may not have such a special designation, and may be evaluated for proper location for attachment of the UWB tags 100.

The tags 100C, 100D may be attached to the notification devices 280, 285 or directly attached to rig personnel. In some embodiments, a single notification device (such as an alarm bell, speaker, or strobe light) may be employed for use with and/or in association with any number of tags 100, and may not be attached to any rig personnel, but rather attached to a rig structure.

Accordingly, once the tags 100A-D are installed, a PLPS software application executed on the computer 260 may associate each tag 100A-D with the equipment or personnel to which it is attached, e.g., in a database. The application further sets anti-collision rules for the tools or personnel, also in association with the equipment/personnel, e.g., again in the database. The PLPS software application may then generate a representation of each person or piece of equipment associated with a tag, potentially along with stationary structures that are not tagged, in a 3D rendering in a display. Once the system 10 is installed and configured, it may provide real-time communication with the tools and control system to enable/disable equipment control and interlocks (i.e. permitting or not permitting the tools to move) based on X, Y, and Z coordinates of the configured equipment/personnel, as will be described in greater detail below.

Embodiments of the present disclosure may track and record positions of personnel and mobile equipment and provide an engineered control solution for many hazards in the rig environment such as people getting caught between, struck by, or in the line of fire of moving machinery; automatically or remotely controlled equipment colliding with each other causing potential dropped objects, damage, and down time; etc. The system could also help provide insights into lessons learned, incident investigations, operations efficiency, and process automation.

Figure 3:
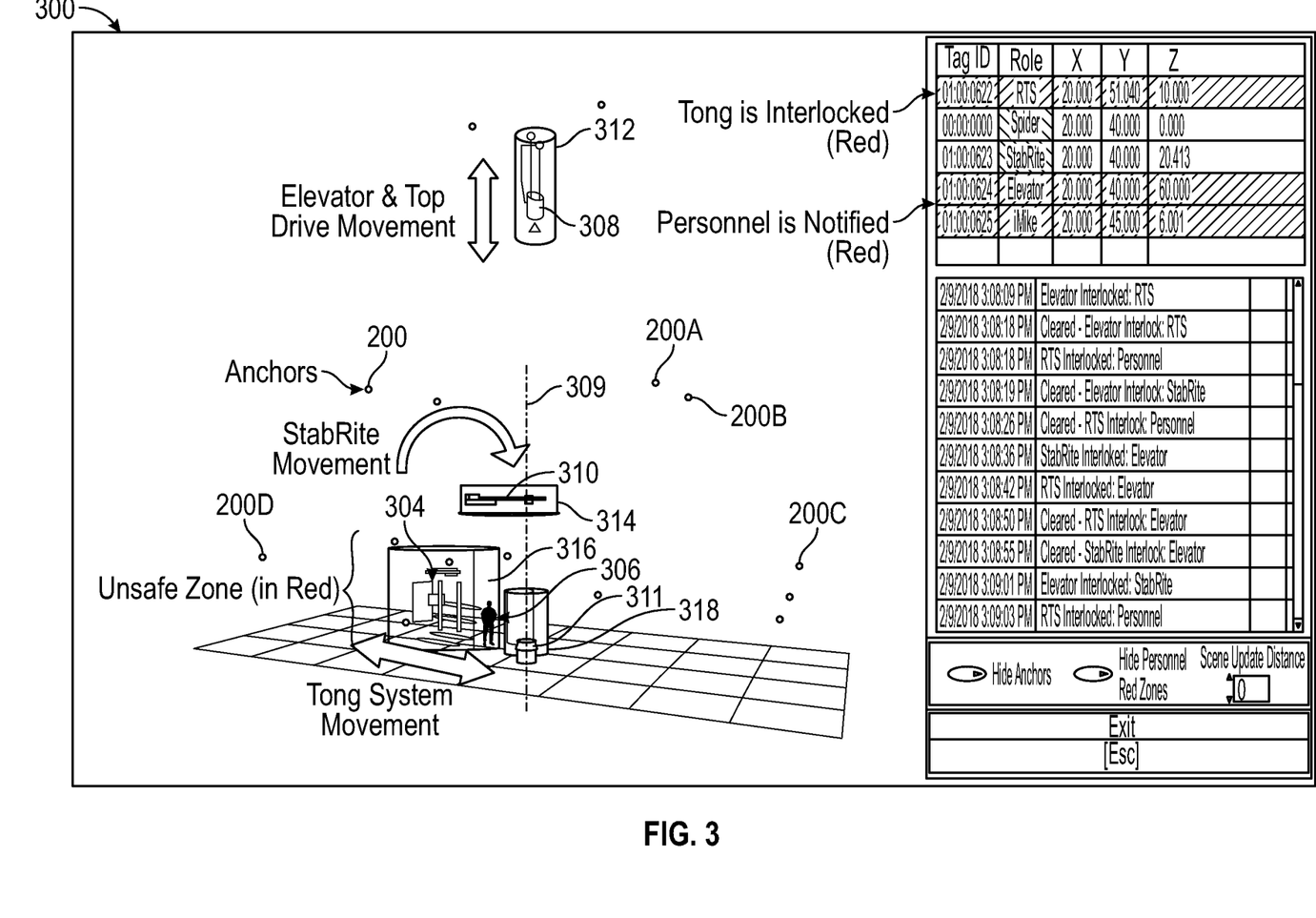
FIG. 3 illustrates a visualization depicting pieces of rig equipment positions on a rig floor, according to an embodiment.

FIG. 3 illustrates a visualization 300 of a rig floor generated using the PLPS software application executing on the computer 260, according to a first example. In this example, the rig floor, and thus the visualization 300 thereof shown, includes a tong system 304, rig personnel (i.e., a person) 306, an elevator 308, a stabbing apparatus 310 (or "StabRite"), and a spider 311.

The system 10 may be assembled by mounting the tags 100A-D to appropriate rig equipment and/or personnel on the rig floor. The tags 100A-D are associated with rig equipment and/or rig personnel 306, and thus shapes associated with the structures to which the individual tags 100A-D are attached are used to populate the visualization 300, as shown. Further, the anchors 200A-D are affixed and powered, represented as dots in this visualization 300 indicating their relative coordinates on the rig floor, e.g., relative to the rig floor and centerline 309 of the wellbore. Multiple anchors 200 are indicated by many dots in this visualization, including those arbitrarily indicated as anchors 200A-D, merely for the sake of continuity with FIG. 1. The anchors 200 may be in communication with the computer 260 (which produces the visualization 300), e.g., via the hub 250.

The PLPS application may also designate "unsafe zones" 312, 314, 316, 318 around the individual pieces of rig equipment 308, 310, 304, 311, respectively, as shown. The size/shape of the unsafe zones 312, 314, 316, 318 may be at least partially a function of the size/shape of the equipment associated therewith. In some embodiments, the size/shape of the unsafe zones 312, 314, 316, 318 may be dynamic, changing due to changed rig conditions, such as, for example, whether the associated rig equipment is in motion (e.g., increase the size of the unsafe zones 312, 314, 316, 318 when the rig equipment associated therewith is in motion).

Entry of a person 306 into an unsafe zone 312, 314, 316, 318 may result in a notification being sent to one of the notification devices 280, 285, providing a message to the rig personnel 306 to vacate the unsafe zone 312, 314, 316. 318. As indicated, various pieces of rig equipment 308, 310, 304, 311 may be movable on the rig floor, and thus the person 306 may enter the unsafe zone (e.g., the unsafe zone 312 around the elevator 308) without moving, e.g., as the elevator 308 moves.

Further, by way of example, as a person 306 enters the unsafe zone 312 of the tong system 304, the PLPS application causes the computer 260 and/or hub 250 to send a notification (e.g., a digital, electronic communication) to the tong control system to block movement of the tong 304. The tong control system receives the block movement notification, and prevents the tong 304 from operating in response to commands from the tong operator. Additionally, the computer and/or hub may send a notification to the person in the unsafe zone, in the form of an alarm or bell, which communicates to the person that he is in an unsafe zone. Local information of the existence of the interlock condition (i.e., that the interlock rule is violated) may be available via an interlock light (e.g., a light-emitting diode (LED)) located on the tong control console, e.g., if the user attempts to function or move the tong 304. Additional information may also be available via the PLPS control system or the computer 260 indicating the interlock condition is present.

Figure 4:
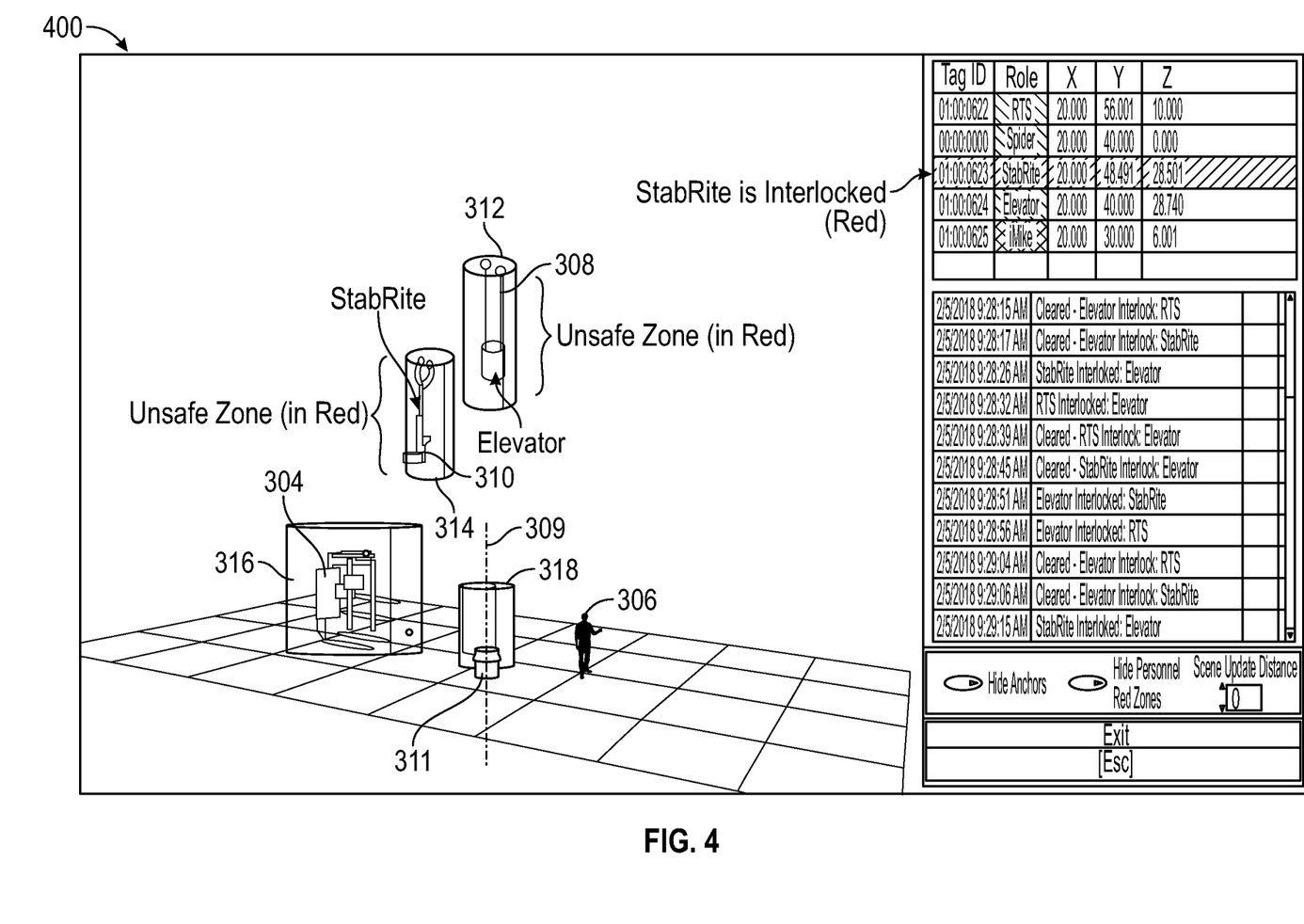
FIG. 4 illustrates another visualization depicting pieces of rig equipment positions on the rig floor, according to an embodiment.

FIG. 4 illustrates another visualization 400 of the rig floor generated using the PLPS application executing on the computer 260, according to an embodiment. Again, the system 10 is assembled, with the tags 100 and anchors 200 in place and in communication with the hub 250 and/or the computer 260. The visualizations of the anchors 200 are omitted in this view for clarity.

The PLPS application is configured to control and/or interlock between the stabbing apparatus 310 and elevator 308 (or top drive). As the elevator 308 (or top drive) enters the unsafe zone 314 of the stabbing apparatus 310, the PLPS application sends a digital message (communication) to the control system of the stabbing apparatus 310 to block deployment of the stabbing apparatus 310. The stabbing apparatus control system receives the block deployment communication, and prevents the user from being able to deploy the stabbing apparatus 310, so as to prevent a collision between the stabbing apparatus 310 and the elevator 308.

Local information representing the existence of the interlock condition (i.e., that the interlock rule is violated) may be available via an interlock light (e.g., light-emitted diode (LED)) located on the stabbing apparatus control console, if the user attempts to deploy the stabbing apparatus 310. Additional information is available via the PLPS application indicating the interlock condition is present. In a separate situation, if the stabbing apparatus is deployed and the elevator approaches the stabbing apparatus' unsafe zone, the stabbing apparatus can be automatically retracted into a safe, upright position to avoid a collision with the elevator, or a signal can be sent to the rig to stop downward movement of the elevator/top drive.

Figure 5:
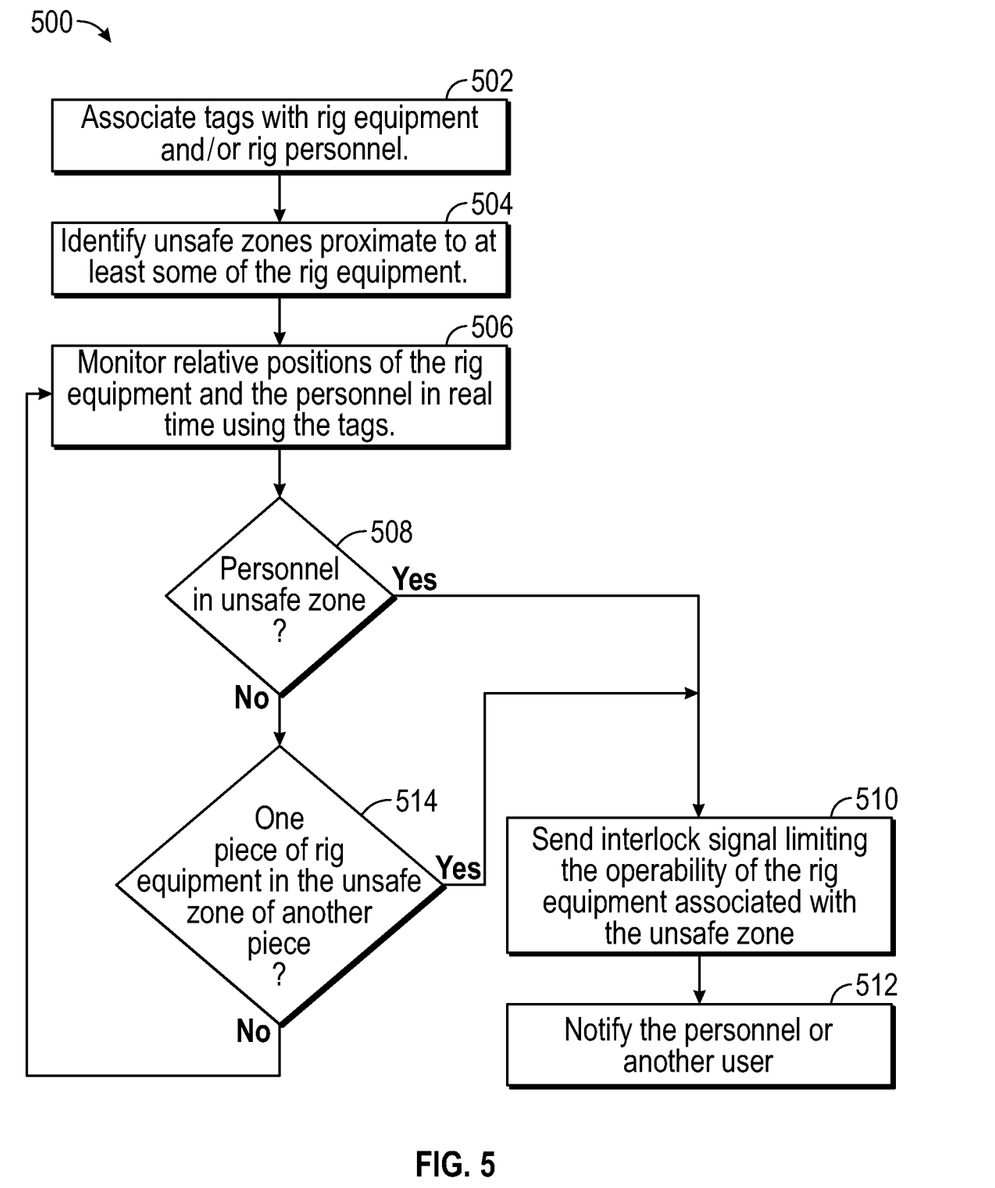
FIG. 5 illustrates a flowchart of a method for avoiding rig equipment and/or personnel collision on a rig, according to an embodiment.

FIG. 5 illustrates a flowchart of a method 500 for avoiding collisions on a rig floor using a PLPS, according to an embodiment. The method 500 may include associating tags with rig equipment and/or personnel on the rig floor, as at 502. Associating the tags at 502 may include attaching the tags to the rig equipment and/or rig personnel. Further, associating at 502 may include storing a unique identifier that corresponds to the tags with the rig equipment and/or personnel to which it is attached in a database. The database may also store the present position (as will be described below), as well as control/interlock rules for the rig equipment.

The method 500 may also identify unsafe zones proximate to at least some of the rig equipment, as at 504. The unsafe zones may essentially be envelopes that surround the rig equipment, sized based on, among other things, the size of the rig equipment itself, as well as a safe distance therefrom. The envelope size and/or shape may change based on the state of an element within a particular piece of rig equipment. For example, the size or shape of the unsafe zones may differ depending on whether a stabbing device boom is extended or retracted. When the envelope of a rig equipment changes size and/or shape, the unsafe zone moves in response to that change. The unsafe zones may be sized such that an article or person positioned within the unsafe zone is at risk by the operation of the rig equipment and/or a collision between the article and the rig equipment is imminent.

The method 500 may also include monitoring the relative positions of each piece of rig equipment and the personnel in real time using the tags, as at 506. The tags and anchors may communicate and establish a continuously-updated scene of the rig, showing the positioning of the rig equipment and/or personnel with tags attached thereto. The database may be updated with the position, which may allow the control system to crosscheck the positioning of the rig equipment/personnel with the unsafe zones and/or otherwise apply established control/interlock rules to maintain safety on the rig.

The method 500 may include determining whether personnel are in the unsafe zone (e.g., as with the tongs example above), as at 508. If the position of a person on the rig indicates that the person is within the unsafe zone (508 is 'YES'), the controller may send a control/interlock signal limiting (or disabling) the operability of the rig equipment associated with the unsafe zone, as at 510. The method 500 may also include notifying the personnel (i.e., in the unsafe zone) and/or another user, allowing for correction of the potentially hazardous situation of a person being in the unsafe zone.

The method 500 may also include determining if a collision between two pieces of rig equipment, and/or between rig equipment and personnel, is imminent based on observed movements and/or learned or predictive movements of equipment and/or personnel. For example, the method 500 may include determining that one rig equipment is in the unsafe zone of another piece of equipment, as at 514 (as with the example of the stabbing apparatus, above) or is moving toward an unsafe zone based on predictive movement. In such case (514 is 'YES'), another control/interlock signal may be set at 510, arresting the movement of either or both of the rig equipment or otherwise at least partially disabling the component, and notifying personnel, as appropriate (i.e. visible and/or audible alarm systems), at 512.

Figure 6:
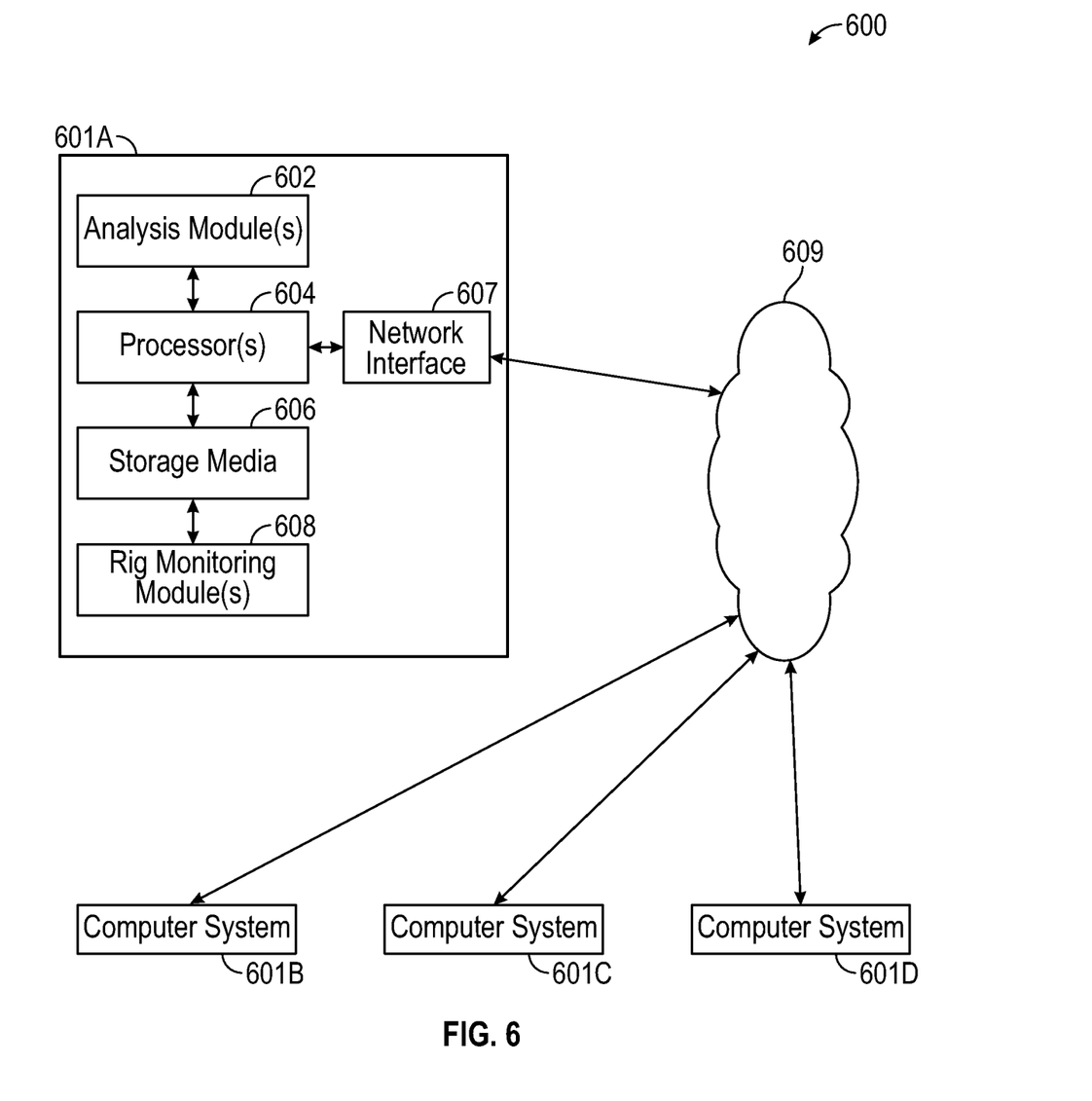
FIG. 6 depicts a computing system for performing at least a portion of one of the methods disclosed herein, according to an embodiment.

In some embodiments, the methods of the present disclosure may be executed by a computing system. FIG. 6 illustrates an example of such a computing system 600, in accordance with some embodiments. The computing system 600 may include a computer or computer system 601A, which may be an individual computer system 601A or an arrangement of distributed computer systems. In various embodiments, the computer system 601A can implement a cloud computing environment. The computer system 601A includes one or more analysis modules 602 that are configured to perform various tasks according to some embodiments, such as one or more methods disclosed herein. To perform these various tasks, the analysis module 602 executes independently, or in coordination with, one or more processors 604, which is (or are) connected to one or more storage media 606. The processor(s) 604 is (or are) also connected to a network interface 607 to allow the computer system 601A to communicate over a data network 609 with one or more additional computer systems and/or computing systems, such as 601B, 601C, and/or 601D (note that computer systems 601B, 601C and/or 601D may or may not share the same architecture as computer system 601A, and may be located in different physical locations, e.g., computer systems 601A and 601B may be located in a processing facility, while in communication with one or more computer systems such as 601C and/or 601D that are located in one or more data centers, and/or located in varying countries on different continents). In various embodiments, computing systems 601B, 601C, and/or 601D can represent computing systems utilized by users of the cloud computing environment.

A processor may include a microprocessor, microcontroller, processor module or subsystem, programmable integrated circuit, programmable gate array, or another control or computing device.

The storage media 606 may be implemented as one or more computer-readable or machine-readable storage media. Note that while in the example embodiment of FIG. 6 storage media 606 is depicted as within computer system 601A, in some embodiments, storage media 606 may be distributed within and/or across multiple internal and/or external enclosures of computing system 601A and/or additional computing systems. Storage media 606 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that instructions may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 600 contains one or more rig monitoring module(s) 608. In the example of computing system 600, computer system 601A includes the rig monitoring module 608. In some embodiments, a single rig monitoring module may be used to perform some aspects of one or more embodiments of the methods disclosed herein. In other embodiments, a plurality of rig monitoring modules may be used to perform some aspects of methods herein.

It should be appreciated that computing system 600 is one example of a computing system, and that computing system 600 may have more or fewer components than shown, may combine additional components not depicted in the example embodiment of FIG. 6, and/or computing system 600 may have a different configuration or arrangement of the components depicted in FIG. 6. The various components shown in FIG. 6 may be implemented in hardware, software, or a combination of both hardware and software, including one or more signal processing and/or application specific integrated circuits.

Further, the steps in the processing methods described herein may be implemented by running one or more functional modules in information processing apparatus such as general-purpose processors or application specific chips, such as ASICs, FPGAs, PLDs, or other appropriate devices. These modules, combinations of these modules, and/or their combination with general hardware are included in various embodiments.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment.

As used herein, the terms "inner" and "outer"; "up" and "down"; "upper" and "lower"; "upward" and "downward"; "above" and "below"; "inward" and "outward"; "uphole" and "downhole"; and other like terms as used herein refer to relative positions to one another and are not intended to denote a particular direction or spatial orientation. The terms "couple," "coupled," "connect," "connection," "connected," "in connection with," and "connecting" refer to "in direct connection with" or "in connection with via one or more intermediate elements or members."

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for mitigating collision occurrences on a drilling rig, comprising:
    associating ultra wide band (UWB) tags with pieces of rig equipment and rig personnel, wherein the tags are configured to communicate with one or more anchors in real-time;
    determining interlock rules associated with each of the pieces of rig equipment;
    monitoring three-axis positions of the pieces of rig equipment and the rig personnel using the tags, wherein the three-axis positions of the pieces of rig equipment and rig personnel are monitored together in the three-axis and in real-time;
    determining that one or more of the interlock rules are violated by a position of one or more of the pieces of rig equipment, rig personnel, or both; and
    in response to determining that the one or more of the interlock rules are violated, at least partially disabling operation of one or more of the pieces of rig equipment.

2. The method of claim 1, further comprising visualizing the pieces of rig equipment and rig personnel on a display, in real-time.

3. The method of claim 1, wherein determining interlock rules comprises defining an unsafe zone around one of the pieces of rig equipment.

4. The method of claim 3, wherein the unsafe zone has a size, shape, or both that is at least partially a function of at least one of whether the at least one of the pieces of the rig equipment is in motion or an operational state of the at least one of the pieces of the rig equipment.

5. The method of claim 3, wherein determining that the one or more of the interlock rules are violated comprises determining that another one of the pieces of rig equipment is positioned at least partially in the unsafe zone.

6. The method of claim 3, wherein determining that the one or more of the interlock rules are violated comprises determining that one of the rig personnel are positioned at least partially in the unsafe zone.

7. The method of claim 1, further comprising notifying at least one of the rig personnel when the one or more of the interlock rules are violated.

8. The method of claim 1, further comprising:
    determining that a collision between two pieces of rig equipment, or between one of the pieces of rig equipment and the rig personnel, or both, is imminent based on predictive movements of equipment and/or the rig personnel; and
    in response, notifying an operator or at least partially disabling operation of one or more of the pieces of rig equipment.

9. A system for mitigating collision on a drilling rig, the system comprising:
a plurality of ultrawide band (UWB) tags associated with a plurality of pieces of rig equipment, rig personnel, or both;
at least one anchor device in communication with the tags and configured to determine a position of the tags by communication therewith; and
at least one control device in communication with the at least one anchor device, wherein the at least one control device is configured to perform operations, the operations comprising:
associating the UWB tags with the pieces of rig equipment, rig personnel, or both to which the plurality of UWB tags are attached;
determining interlock rules associated with each of the pieces of rig equipment;
monitoring positions of the pieces of rig equipment and the rig personnel using the tags, in real-time;
determining that one or more of the interlock rules are violated by a position of one or more of the pieces of rig equipment, rig personnel, or both;
in response to determining that the one or more of the interlock rules are violated, notifying an operator or at least partially disabling operation of one or more of the pieces of rig equipment; and
communicating a message representing that one or more of the interlock rules is violated to the at least one control device, wherein the at least one control device is configured to move one of the pieces of rig equipment so as to avoid violating the interlock rules.

10. The system of claim 9, wherein determining that the one or more of the interlock rules are being violated comprises determining that a person is in an unsafe zone, and wherein the operations further comprise notifying the person that the person is in the unsafe zone.

11. The system of claim 10, further comprising a notification device, wherein notifying the person comprises sounding an audible or vibrating alarm of the notification device.

12. The system of claim 9, wherein determining interlock rules comprises defining an unsafe zone around one of the pieces of rig equipment.

13. The system of claim 12, wherein determining that the one or more of the interlock rules are violated comprises determining that another one of the pieces of rig equipment is positioned at least partially in the unsafe zone.

14. The system of claim 9, further comprising a display coupled to the control device, wherein the operations further comprise visualizing the pieces of rig equipment and rig personnel on the display, in real-time.

15. The system of claim 9, further comprising notifying at least one of the rig personnel when the one or more of the interlock rules are violated.

16. The system of claim 15, wherein the operations further comprise:
determining that a collision between two pieces of rig equipment, and/or between one of the pieces of rig equipment and the rig personnel, is imminent based on predictive movements of equipment and/or the rig personnel; and
in response, notifying an operator or at least partially disabling operation of one or more of the pieces of rig equipment.

17. A non-transitory, computer-readable medium storing instructions that, when executed, cause a computing system to perform operations, the operations comprising:
associating ultra wide band (UWB) tags with pieces of rig equipment and rig personnel, wherein the tags are configured to communicate with one or more anchors in real-time;
determining interlock rules associated with each of the pieces of rig equipment;
monitoring three-axis positions of the pieces of rig equipment and the rig personnel using the tags, wherein the three-axis positions of the pieces of rig equipment and rig personnel are monitored together in the three-axis and in real-time;
determining that one or more of the interlock rules are violated by a position of one or more of the pieces of rig equipment, rig personnel, or both; and
in response to determining that the one or more of the interlock rules are violated, notifying an operator or at least partially disabling operation of one or more of the pieces of rig equipment.

18. The medium of claim 17, wherein the operations further comprise visualizing the pieces of rig equipment and rig personnel and changes in position thereof on a display, in real-time.

19. The medium of claim 17, wherein determining interlock rules comprises defining an unsafe zone around one of the pieces of rig equipment.

20. The medium of claim 19, wherein determining that the one or more of the interlock rules are violated comprises determining that another one of the pieces of rig equipment is positioned at least partially in the unsafe zone.

21. The medium of claim 19, wherein determining that the one or more of the interlock rules are violated comprises determining that one of the rig personnel are positioned at least partially in the unsafe zone.

22. The medium of claim 19, further comprising notifying at least one of the rig personnel when the one or more of the interlock rules are violated.

23. The medium of claim 17, further comprising:
determining that a collision between two pieces of rig equipment, and/or between one of the pieces of rig equipment and the rig personnel is imminent based on predictive movements of equipment and/or the rig personnel; and
in response, notifying an operator or at least partially disabling operation of one or more of the pieces of rig equipment.

24. The method of claim 1, further comprising:
mounting the one or more anchors at one or more reference positions on a structure of the drilling rig, wherein the one or more anchors are in communication with a control device; and
attaching the tags with the pieces of rig equipment and rig personnel,
wherein monitoring comprises monitoring the positions of the pieces of rig equipment and rig personnel based on a distance and direction from the one or more anchors.

* * * * *